United States Patent
Kito et al.

(10) Patent No.: US 11,992,980 B2
(45) Date of Patent: May 28, 2024

(54) FOAMED RESIN MOLDED ARTICLE AND METHOD FOR MANUFACTURING SAME

(71) Applicant: TOYOTA BOSHOKU KABUSHIKI KAISHA, Aichi (JP)

(72) Inventors: Masayuki Kito, Aichi (JP); Goro Takahashi, Aichi (JP); Toshihiro Suzuki, Aichi (JP); Yasuyuki Shimizu, Aichi (JP); Kosuke Tamaki, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 290 days.

(21) Appl. No.: 16/073,589

(22) PCT Filed: Mar. 10, 2017

(86) PCT No.: PCT/JP2017/009805
§ 371 (c)(1),
(2) Date: Jul. 27, 2018

(87) PCT Pub. No.: WO2017/155114
PCT Pub. Date: Sep. 14, 2017

(65) Prior Publication Data
US 2019/0022903 A1   Jan. 24, 2019

(30) Foreign Application Priority Data
Mar. 11, 2016   (JP) .................. 2016-048815

(51) Int. Cl.
*B29C 44/04*  (2006.01)
*B29C 44/34*  (2006.01)
(Continued)

(52) U.S. Cl.
CPC .......... *B29C 44/04* (2013.01); *B29C 44/3442* (2013.01); *B29C 44/421* (2013.01);
(Continued)

(58) Field of Classification Search
CPC ......... B29C 44/00; B29C 44/04; C08L 23/00; C08L 23/12
See application file for complete search history.

(56) References Cited

U.S. PATENT DOCUMENTS 4,455,338 A * 6/1984 Henne .................... B60K 37/00
428/137
4,540,718 A * 9/1985 Senda ...................... C08J 9/228
521/142
(Continued)

FOREIGN PATENT DOCUMENTS

EP   0 261 748 A2   3/1988
EP   0 472 344 A2   2/1992
(Continued)

OTHER PUBLICATIONS

Korean Notification of refusal from Korean Application No. 10-2018-7022695, dated Sep. 4.
(Continued)

*Primary Examiner* — Jeffrey M Wollschlager
*Assistant Examiner* — Edgaredmanuel Troche
(74) *Attorney, Agent, or Firm* — GREENBLUM & BERNSTEIN, P.L.C.

(57) ABSTRACT

Disclosed herein are a foamed resin molded body that has excellent impact resistance and rigidity and that is hardly fractured even when subjected to high impact, and a method for manufacturing the same. The foamed resin molded body is made of an olefin-based resin composition containing an olefin resin and a polyamide resin, the olefin-based resin composition has a continuous phase containing the olefin resin and a dispersed phase dispersed in the continuous phase and containing the polyamide resin, and the dispersed
(Continued)

phase contains a melt-kneaded product of the polyamide resin and an elastomer having a reactive group that reacts with the polyamide resin.

14 Claims, 2 Drawing Sheets

(51) Int. Cl.
| | |
|---|---|
| B29C 44/42 | (2006.01) |
| B29C 48/00 | (2019.01) |
| B29C 48/40 | (2019.01) |
| B29K 23/00 | (2006.01) |
| B29K 25/00 | (2006.01) |
| B29K 77/00 | (2006.01) |
| B29K 105/04 | (2006.01) |
| C08J 9/00 | (2006.01) |
| C08J 9/08 | (2006.01) |
| C08L 23/00 | (2006.01) |
| C08L 23/12 | (2006.01) |
| C08L 23/16 | (2006.01) |
| C08L 23/26 | (2006.01) |
| C08L 53/00 | (2006.01) |
| C08L 53/02 | (2006.01) |
| C08L 77/00 | (2006.01) |
| C08L 77/02 | (2006.01) |
| C08L 77/06 | (2006.01) |

(52) U.S. Cl.
CPC ........... *B29C 48/022* (2019.02); *B29C 48/40* (2019.02); *C08J 9/0061* (2013.01); *C08J 9/08* (2013.01); *C08L 23/00* (2013.01); *C08L 23/12* (2013.01); *C08L 23/16* (2013.01); *C08L 23/26* (2013.01); *C08L 53/00* (2013.01); *C08L 53/02* (2013.01); *C08L 77/00* (2013.01); *C08L 77/02* (2013.01); *C08L 77/06* (2013.01); *B29K 2023/06* (2013.01); *B29K 2023/12* (2013.01); *B29K 2025/06* (2013.01); *B29K 2077/10* (2013.01); *B29K 2105/04* (2013.01); *C08J 2201/03* (2013.01); *C08J 2203/02* (2013.01); *C08J 2323/12* (2013.01); *C08J 2477/00* (2013.01); *C08L 2203/14* (2013.01); *C08L 2205/03* (2013.01); *C08L 2205/035* (2013.01); *C08L 2205/05* (2013.01); *C08L 2205/22* (2013.01)

(56) References Cited

U.S. PATENT DOCUMENTS

| | | | |
|---|---|---|---|
| 5,010,136 A | 4/1991 | Ohmae et al. | |
| 5,234,757 A * | 8/1993 | Wong | B29B 15/122 428/311.11 |
| 5,491,188 A | 2/1996 | Ikeda et al. | |
| 6,177,036 B1 * | 1/2001 | Van Der Hoeven | B29C 44/5627 264/288.8 |
| 8,025,959 B2 * | 9/2011 | Hashiba | B32B 5/18 428/300.7 |
| 8,993,677 B2 * | 3/2015 | Mitadera | C08G 69/26 525/178 |
| 2002/0043643 A1 * | 4/2002 | Korehisa | C08F 10/06 252/71 |
| 2007/0083007 A1 | 4/2007 | Jacob | |
| 2008/0105992 A1 * | 5/2008 | Walker | B60R 13/08 264/45.4 |
| 2009/0176045 A1 * | 7/2009 | Kanae | C08L 23/02 428/35.7 |
| 2012/0028047 A1 | 2/2012 | Imai et al. | |
| 2013/0209784 A1 * | 8/2013 | Nakagawa | C08L 77/00 428/314.8 |
| 2014/0044954 A1 | 2/2014 | Matsubara et al. | |
| 2014/0364569 A1 * | 12/2014 | Kito | C08L 77/02 525/183 |
| 2014/0371394 A1 | 12/2014 | Kito et al. | |
| 2015/0105483 A1 * | 4/2015 | Shima | C08J 9/18 521/59 |
| 2015/0218373 A1 | 8/2015 | Kawada et al. | |
| 2016/0300639 A1 * | 10/2016 | Choi | C08L 51/06 |

FOREIGN PATENT DOCUMENTS

| | | |
|---|---|---|
| EP | 2796497 | 10/2014 |
| EP | 3385322 | 10/2018 |
| JP | 63-89550 A | 4/1988 |
| JP | 3-66735 A | 3/1991 |
| JP | 4-96957 A | 3/1992 |
| JP | 4-96969 A | 3/1992 |
| JP | 4-183733 A | 6/1992 |
| JP | 4-202247 A | 7/1992 |
| JP | 7-18088 A | 1/1995 |
| JP | 2541292 | 7/1996 |
| JP | 11-310656 A | 11/1999 |
| JP | 2000-108263 A | 4/2000 |
| JP | 2001-226537 A | 8/2001 |
| JP | 2003-128057 A | 5/2003 |
| JP | 2003-128846 A | 5/2003 |
| JP | 2003-155419 | 5/2003 |
| JP | 2007-161963 A | 6/2007 |
| JP | 2009-511662 A | 3/2009 |
| JP | 2009-74081 A | 4/2009 |
| JP | 2009-74082 A | 4/2009 |
| JP | 2011-208118 A | 10/2011 |
| JP | 2012-140509 A | 7/2012 |
| JP | 2012-233055 A | 11/2012 |
| JP | 2013-1826 A | 1/2013 |
| JP | 2013-147645 A | 8/2013 |
| JP | 2013-147646 A | 8/2013 |
| JP | 2013-147647 A | 8/2013 |
| JP | 2013-147648 A | 8/2013 |
| JP | 2014-25060 A | 2/2014 |
| KR | 10-2014-0105826 A | 9/2014 |
| WO | 91/02027 A1 | 2/1991 |
| WO | 2009/069725 A1 | 6/2009 |
| WO | 2010/107022 A1 | 9/2010 |
| WO | 2015/046357 A1 | 4/2015 |

OTHER PUBLICATIONS

International Search Report from Patent Application No. PCT/JP2017/009805, dated May 30, 2017.

International Preliminary Report on Patentability from Patent Application No. PCT/JP2017/009805, dated Sep. 11, 2018.

India Office Action, India Patent Office, Application No. 201817021378, issued Dec. 11, 2019, with English translation.

Chinese Office Action issued with respect to Chinese Application No. 201780006915.5, dated Oct. 31, 2018.

European Search Report, European patent Office, Application No. 17763446.6, issued Oct. 8, 2019.

\* cited by examiner

FOAMED RESIN MOLDED ARTICLE AND METHOD FOR MANUFACTURING SAME

TECHNICAL FIELD

The present invention relates to a foamed resin molded body having excellent impact resistance and a method for manufacturing the same.

BACKGROUND ART

Foamed molded bodies obtained using thermoplastic resin compositions are used for automobile parts, office equipment parts, daily goods, kitchen utensils, building material parts, and sporting goods, and for example, those described in the following patent literatures are known.

Patent Literature 1 discloses a foamed resin molded body containing polypropylene, which includes a skin layer that forms a surface and a foamed layer that forms an interior, wherein the formed layer includes a plurality of first foam cells and a plurality of second foam cells that are formed between the first foam cells and that are smaller than the first foam cells.

Further, Patent Literature 2 discloses a foamed molded body obtained using a resin composition for injection foaming including at least a polypropylene-based resin, a polyethylene-based resin (A) having a melt flow rate of 1 g/10 min or more but less than 10 g/10 min as measured in accordance with ASTM 1238 at a temperature of 190° C. and a load of 2.16 kg, a melt tension of 150 mN or more, a strain hardening property, and a density of 915 kg/m$^3$ or more but 970 kg/m$^3$ or less as measured in accordance with JIS K 6760, and at least one thermoplastic resin (B) selected from the group consisting of an alkenyl aromatic compound unit-containing rubber and an ethylene-α-olefin-based copolymer having a density of 850 kg/m$^3$ or more but 910 kg/m$^3$ or less as measured in accordance with JIS K 6760 and a melt flow rate of 3 g/10 min or more as measured in accordance with ASTM 1238 at a temperature of 190° C. and a load of 2.16 kg.

CITATIONS LIST

Patent Literatures

Patent Literature 1: JP 2012-233055 A
Patent Literature 2: JP 2013-1826 A

SUMMARY OF INVENTION

Technical Problems

Conventionally-known foamed molded bodies have not yet achieved sufficient impact resistance, and therefore there has been demand for foamed molded bodies having more excellent impact resistance. Further, there has also been demand for foamed molded bodies that are hardly fractured even when subjected to high impact.

It is an object of the present invention to provide a foamed resin molded body that has excellent impact resistance and rigidity and that are hardly fractured even when subjected to high impact, and a method for manufacturing the same.

Solutions to Problems

The present invention includes the following aspects.
[1] A foamed resin molded body comprising an olefin-based resin composition containing an olefin resin and a polyamide resin, wherein
  the olefin-based resin composition has a continuous phase containing the olefin resin and a dispersed phase dispersed in the continuous phase and containing the polyamide resin, and
  the dispersed phase contains a melt-kneaded product of the polyamide resin and an elastomer having a reactive group that reacts with the polyamide resin.
[2] The foamed resin molded body according to the above [1], wherein the dispersed phase has a matrix phase containing the polyamide resin and a fine dispersed phase dispersed in the matrix phase and containing the elastomer having the reactive group, and gas bubbles formed by foaming are present not in the dispersed phase and the fine dispersed phase but only in the continuous phase.
[3] The foamed resin molded body according to the above [1] or [2], wherein a ratio of the dispersed phase is 70% by mass or less per 100% by mass of a total of the continuous phase and the dispersed phase.
[4] The foamed resin molded body according to any one of the above [1] to [3], wherein the olefin resin is a polymer containing a structural unit derived from propylene.
[5] The foamed resin molded body according to any one of the above [1] to [4], wherein the polyamide resin is at least one selected from polyamide 6, polyamide 66, polyamide 610, polyamide 612, polyamide 614, polyamide 11, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T.
[6] The foamed resin molded body according to any one of the above [1] to [5], wherein the elastomer having the reactive group is an olefin-based thermoplastic elastomer containing a structural unit derived from ethylene or propylene or a styrene-based thermoplastic elastomer containing a structural unit derived from an aromatic vinyl compound.
[7] The foamed resin molded body according to any one of the above [1] to [6], wherein the elastomer having the reactive group is at least one selected from an acid anhydride-modified elastomer, a carboxylic acid-modified elastomer, an epoxy-modified elastomer, and an oxazoline-modified elastomer.
[8] A foamed resin molded body manufacturing method for manufacturing the foamed resin molded body according to any one of the above [1] to [7], comprising:
  foaming a manufacturing material obtained by a method comprising a first melt-kneading step in which a polyamide resin and an elastomer having a reactive group that reacts with the polyamide resin are melt-kneaded, a second melt-kneading step in which a first melt-kneaded product obtained in the first melt-kneading step and an olefin resin are melt-kneaded, and a mixing step in which a second melt-kneaded product obtained in the second melt-kneading step and an olefin resin are mixed.
[9] The foamed resin molded body manufacturing method according to the above [8], wherein the olefin resin used in the mixing step is different from the olefin resin used in the second melt-kneading step.

[10] The foamed resin molded body manufacturing method according to the above [9], wherein the olefin resin used in the mixing step has flowability higher than that of the olefin resin used in the second melt-kneading step.

[11] A foamed resin molded body manufacturing method for manufacturing the foamed resin molded body according to any one of the above [1] to [7], comprising:

foaming a manufacturing material obtained by a method comprising a first melt-kneading step in which a polyamide resin and an elastomer having a reactive group that reacts with the polyamide resin are melt-kneaded and a second melt-kneading step in which a first melt-kneaded product obtained in the first melt-kneading step and an olefin resin are melt-kneaded.

Advantageous Effects of Invention

The foamed resin molded body according to the present invention is superior to a foamed molded body made of an olefin resin in impact resistance and rigidity, and is therefore hardly fractured even when subjected to high impact. Therefore, the foamed resin molded body according to the present invention is suitable for a wide variety of applications such as automobile-related parts, ship-related parts, aircraft-related parts, office equipment parts, daily goods, kitchen utensils, building material parts, and sporting goods.

When the dispersed phase has a matrix phase containing the polyamide resin and a fine dispersed phase dispersed in the matrix phase and containing the elastomer having the reactive group, and gas bubbles formed by foaming are present not in the dispersed phase and the fine dispersed phase but only in the continuous phase, it is possible to obtain a foamed resin molded body having a multiple phase structure and more excellent impact resistance, and further it is possible to obtain a foamed resin molded body having impact resistance while maintaining a phase structure.

When the ratio of the dispersed phase is 70% by mass or less per 100% by mass of a total of the continuous phase and the dispersed phase, it is possible to achieve an excellent balance of impact resistance, rigidity, and moldability.

When the olefin resin is a polymer containing a structural unit derived from propylene, it is possible to obtain a foamed resin molded body having excellent impact resistance at low cost.

When the polyamide resin is at least one selected from polyamide 6, polyamide 66, polyamide 610, polyamide 612, polyamide 614, polyamide 11, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T, it is possible to select a foamed resin molded body having excellent impact resistance from the above polyamides.

When the elastomer having the reactive group is an olefin-based thermoplastic elastomer containing a structural unit derived from ethylene or propylene or a styrene-based thermoplastic elastomer containing a structural unit derived from an aromatic vinyl compound, it is possible to more reliably obtain a particular phase structure and therefore to obtain a foamed resin molded body that can offer excellent impact resistance.

When the elastomer having the reactive group is at least one selected from an acid anhydride-modified elastomer, a carboxylic acid-modified elastomer, an epoxy-modified elastomer, and an oxazoline-modified elastomer, it is possible to select a foamed resin molded body having excellent impact resistance from the above elastomers.

According to the foamed resin molded body manufacturing method of the present invention, it is possible to efficiently obtain a foamed resin molded body that is hardly fractured even when subjected to high impact and that has excellent appearance.

Further, according to the other foamed resin molded body manufacturing method of the present invention including a mixing step, it is possible to obtain a foamed resin molded body having excellent impact resistance at low cost.

When the olefin resin used in the mixing step is different from the olefin resin used in the second melt-kneading step, a polyolefin resin suitable for producing the second melt-kneaded product can be used as the olefin resin used in the second melt-kneading step, and a polyolefin resin suitable for foaming can be used as the olefin rein used in the mixing step.

When the olefin resin used in the mixing step has flowability higher than that of the olefin resin used in the second melt-kneading step, excellent flowability in a mold is achieved during injection molding.

DESCRIPTION OF EMBODIMENTS

Figure 1:
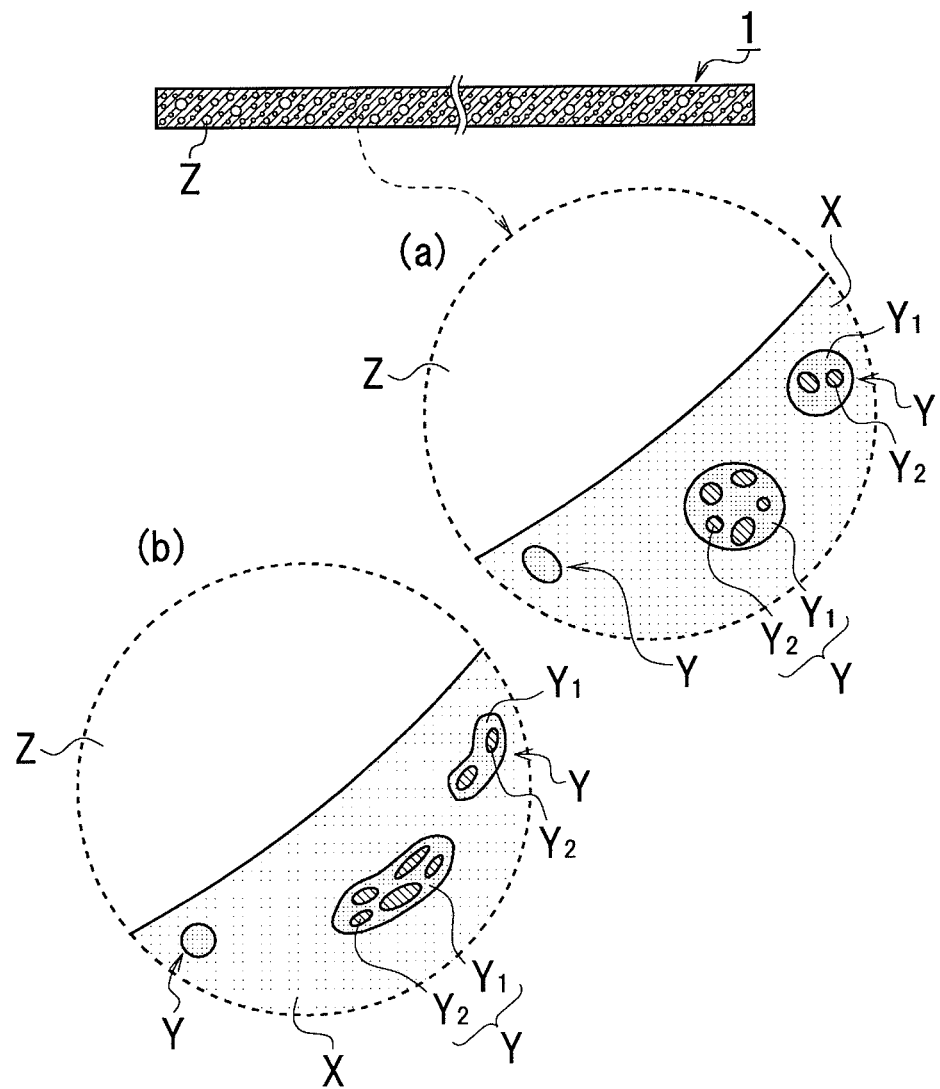
FIG. 1 is an explanatory diagram for explaining the phase structure of a foamed resin molded body according to the present invention.

The particulars shown herein are by way of example and for purposes of illustrative discussion of the embodiments of the present invention only and presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

1. Foamed Resin Molded Body

A foamed resin molded body (1) according to the present invention includes an olefin-based resin composition containing an olefin resin (hereinafter, referred to as an "olefin resin (A)") and a polyamide resin (hereinafter, referred to as a "polyamide resin (B)") and having a particular structure. The olefin-based resin composition has a continuous phase (X) containing the olefin resin (A) and a dispersed phase (Y) dispersed in the continuous phase (X) and containing the polyamide resin, and the dispersed phase (Y) contains a melt-kneaded product of the polyamide resin (B) and an elastomer having a reactive group that reacts with the polyamide resin (B) (hereinafter, referred to as a "modified elastomer") (see FIG. 1). The foamed resin molded body according to the present invention has a skin layer and a cell wall, and these parts are made of the olefin-based resin composition.

The olefin-based resin composition is preferably a thermoplastic resin composition. The continuous phase (X) constituting the olefin-based resin composition contains the olefin resin (A), and may further contain another resin (which will be described later) depending on the purpose, intended use, etc. Further, the structure of the continuous phase is not particularly limited, and may be either a crosslinked structure or a non-crosslinked structure.

The olefin resin (A) is not particularly limited, and may be a conventionally-known polyolefin to be used for forming molded articles. Examples of the olefin resin (A) include an ethylene homopolymer, a copolymer of ethylene and an unsaturated hydrocarbon having 3 carbon atoms or more (hereinafter, referred to as an "α-olefin"), an α-olefin homopolymer, and a copolymer of two or more α-olefins. These polymers and copolymers may be used singly or in combination of two or more of them.

Examples of the α-olefin include propylene, 1-butene, 1-pentene, 1-hexene, 1-heptene, 3-methyl-1-butene, and 4-methyl-1-pentene.

The olefin resin (A) is preferably an α-olefin homopolymer or copolymer, more preferably polypropylene, an ethylene-propylene copolymer, an ethylene-1-butene copolymer, or an ethylene-propylene-1-butene copolymer, particularly preferably a polymer containing a structural unit derived from propylene.

Further, from the viewpoint of foam moldability, the olefin resin preferably contains two or more different olefin resins. More specifically, for example, olefin resins may be used, one of which has flowability relatively higher than that of the other. This difference in flowability can be evaluated by comparison of flowability measurements measured at a certain temperature and a shear rate of 0 $sec^{-1}$. More specifically, different olefin resins whose difference in MFR (temperature 230° C., load 2.16 kg) is 15 g/10 min or more (usually, 60 g/10 min or less) may be used. Further, an olefin resin whose MFR (temperature 230° C., load 2.16 kg) is 30 g/10 min or less (usually, 1 g/10 min or more) may be used as an olefin resin having low flowability, and an olefin resin whose MFR (temperature 230° C., load 2.16 kg) is 45 g/10 min or more (usually, 90 g/10 min or less) may be used as an olefin resin having high flowability. Further, as will be described later, a propylene homopolymer may be used as an olefin resin having low flowability, and a propylene block polymer may be used as an olefin resin having high flowability.

The weight-average molecular weight (based on polystyrene standards) of the olefin resin (A) measured by gel permeation chromatography (GPC) is preferably 10,000 to 500,000, more preferably 100,000 to 450,000, even more preferably 200,000 to 400,000 from the viewpoint of the foam cell stability, impact resistance, and rigidity of the foamed resin molded body.

The continuous phase (X) may be composed of only the olefin resin (A) or, as described above, may further contain another resin as long as the other resin forms the continuous phase together with the olefin resin (A). In the latter case, the other resin is preferably a resin that is compatible with the olefin resin (A) but incompatible with the polyamide resin (B).

The continuous phase contains a dispersed phase, and may contain an additive that will be described later in a dispersed state.

The dispersed phase (Y) contains a melt-kneaded product of the polyamide resin (B) and a modified elastomer. The preferred structure of this dispersed phase will be described later.

The polyamide resin (B) is not particularly limited as long as it has amide bonds (—NH—CO—) in its main chain. Examples of the polyamide resin (B) include resins obtained by conventionally-known methods such as a resin obtained by ring-opening polymerization of a lactam, a resin obtained by dehydration condensation of amino acids, a resin obtained by polycondensation of a diamine and a dicarboxylic acid, and a resin obtained by polycondensation of aminocarboxylic acids. These resins may be used singly or in combination of two or more of them.

Hereinbelow, examples of raw material compounds to be used for producing the polyamide resin (B) will be mentioned. These raw material compounds may be used singly or in combination of two or more of them to obtain the polyamide resin (B). Examples of the lactam include ε-caprolactam, undecanelactam, and ω-lauryllactam.

Examples of the amino acid include aminocaproic acid, aminoundecanoic acid, aminododecanoic acid, and para-aminomethylbenzoic acid.

Examples of the diamine include: aliphatic diamines such as ethylenediamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexanediamine and bis-(4-aminocyclohexyl)methane; aromatic diamines such as m-phenylenediamine, p-phenylenediamine, m-xylylenediamine, and p-xylylenediamine.

Examples of the dicarboxylic acid include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, and octadecanedioic acid; alicyclic dicarboxylic acids such as cyclohexanedicarboxylic acid; and aromatic dicarboxylic acids such as orthophthalic acid, terephthalic acid, isophthalic acid, and naphthalene dicarboxylic acid.

Specific examples of the polyamide resin (B) include polyamide 6, polyamide 66, polyamide 610, polyamide 612, polyamide 614, polyamide 11, polyamide 12, polyamide 6T, polyamide 6I, polyamide 9T, polyamide M5T, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These resins may be used singly or in combination of two or more of them. In the present invention, polyamide 11 is particularly preferred, and an embodiment using polyamide 11 singly and an embodiment using polyamide 11 and another polyamide resin in combination are both preferred.

Among the above polyamide resins, polyamide 11, polyamide 610, polyamide 1010, polyamide 614, and polyamide 10T are plant-derived polyamide resins. The plant-derived polyamide resins are resins using monomers obtained from plant-derived components such as vegetable oils, and are therefore preferred from the viewpoint of environmental protection (especially from the viewpoint of carbon neutral).

Polyamide 11 has a structure in which monomers having 11 carbon atoms are linked via amide bonds. As the monomer of polyamide 11, aminoundecanoic acid derived from castor oil may be used. The content of a structural unit derived from the monomer having 11 carbon atoms is preferably 50% or more but may be 100% of all the structural units of polyamide 11.

Polyamide 610 has a structure in which monomers having 6 carbon atoms and monomers having 10 carbon atoms are linked via amide bonds. Polyamide 610 can be formed using sebacic acid derived from castor oil as a monomer. The total content of a structural unit derived from the monomer having 6 carbon atoms and a structural unit derived from the monomer having 10 carbon atoms is preferably 50% or more but may be 100% of all the structural units of polyamide 610.

Polyamide 1010 has a structure in which a diamine having 10 carbon atoms and a dicarboxylic acid having 10 carbon atoms are copolymerized. Polyamide 1010 can be formed using, as monomers, 1,10-decanediamine (decamethylenediamine) and sebacic acid derived from castor oil. The total content of a structural unit derived from the diamine having 10 carbon atoms and a structural unit derived from the dicarboxylic acid having 10 carbon atoms is preferably 50% or more but may be 100% of all the structural units of polyamide 1010.

Polyamide 614 has a structure in which monomers having 6 carbon atoms and monomer having 14 carbon atoms are linked via amide bonds. Polyamide 614 can be formed using a plant-derived dicarboxylic acid having 14 carbon atoms as a monomer. The total content of a structural unit derived from the monomer having 6 carbon atoms and a structural unit derived from the monomer having 14 carbon atoms is preferably 50% or more but may be 100% of all the structural units of polyamide 614.

Polyamide 10T has a structure in which a diamine having 10 carbon atoms and terephthalic acid are linked via amide bonds. Polyamide 10T can be formed using 1,10-decandiamine (decamethylenediamine) derived from castor oil as a monomer. The total content of a structural unit derived from the diamine having 10 carbon atoms and a structural unit derived from terephthalic acid is preferably 50% or more but may be 100% of all the structural units of polyamide 10T.

Among the above five plant-derived polyamide resins, polyamide 11 is superior to the other four plant-derived polyamide resins in terms of low water absorbability, low specific gravity, and high biomass degree.

Polyamide 610 is inferior to polyamide 11 in water absorption rate, chemical resistance, and impact strength, but is excellent in heat resistance (melting point) and rigidity (strength). Further, polyamide 610 is superior to polyamide 6 and polyamide 66 in terms of low water absorbability and excellent size stability, and therefore can be used as an alternative to polyamide 6 or polyamide 66.

Polyamide 1010 is superior to polyamide 11 in heat resistance and rigidity. Further, the biomass degree of polyamide 1010 is comparable to that of polyamide 11, and therefore polyamide 1010 can be used for parts required to have higher durability.

Polyamide 10T contains aromatic rings in its molecular frame, and therefore has a higher melting point and higher rigidity than polyamide 1010. Therefore, polyamide 10T can be used in harsh environments (parts required to have heat resistance, parts on which a force is to be exerted).

The modified elastomer has a reactive group that reacts with the polyamide resin (B), and examples of the reactive group include an acid anhydride group (—CO—O—OC—), a carboxyl group (—COOH), an epoxy group (—$C_2O$ (a three-membered ring structure composed of two carbon atoms and one oxygen atom)), an oxazoline group (—$C_3H_4NO$), and an isocyanate group (—NCO). These reactive groups may be contained in the modified elastomer singly or in combination of two or more of them.

The amount of modification (the number of reactive groups) of the modified elastomer is not particularly limited, but is preferably 1 to 50, more preferably 3 to 30, even more preferably 5 to 20.

Examples of the modified elastomer include a modified elastomer containing a (co)polymer obtained using a monomer having a reactive group, a modified elastomer obtained by forming a reactive group by oxidative decomposition of a (co)polymer, and a modified elastomer obtained by graft polymerization of an organic acid on a (co)polymer. These modified elastomers may be used singly or in combination of two or more of them.

The modified elastomer is preferably one obtained by adding the reactive group to an olefin-based thermoplastic elastomer or a styrene-based thermoplastic elastomer.

The olefin-based thermoplastic elastomer is preferably an α-olefin-based copolymer containing a structural unit derived from an α-olefin having 3 to 8 carbon atoms, more preferably an ethylene-α-olefin copolymer, α-olefin copolymer, α-olefin-non-conjugated diene copolymer, or ethylene-α-olefin-non-conjugated diene copolymer containing a structural unit derived from ethylene or propylene. Among them, an ethylene-α-olefin copolymer and an ethylene-α-olefin-non-conjugated diene copolymer are particularly preferred. Examples of the non-conjugated diene include: linear non-cyclic diene compounds such as 1,4-pentadiene, 1,4-hexadiene, 1,5-hexadiene, and 1,6-hexadiene; branched-chain non-cyclic diene compounds such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene, and dihydromyrcene; and alicyclic diene compounds such as tetrahydroindene, methyltetrahydroindene, dicyclopentadiene, bicyclo[2.2.1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene.

Examples of the olefin-based thermoplastic elastomer include an ethylene-propylene copolymer, an ethylene-1-butene copolymer, an ethylene-1-pentene copolymer, an ethylene-1-hexene copolymer, an ethylene-1-octene copolymer, a propylene-1-butene copolymer, a propylene-1-pentene copolymer, a propylene-1-hexene copolymer, and a propylene-1-octene copolymer. Among them, an ethylene-propylene copolymer, an ethylene-1-butene copolymer, and an ethylene-1-octene copolymer are preferred.

The weight-average molecular weight (based on polystyrene standards) of the olefin-based thermoplastic elastomer measured by gel permeation chromatography (hereinafter, referred to as "GPC") is preferably 10,000 to 500,000, more preferably 20,000 to 500,000, even more preferably 30,000 to 300,000.

Examples of the styrene-based thermoplastic elastomer include a block copolymer of an aromatic vinyl compound and a conjugated diene compound and a hydrogenated product thereof.

The aromatic vinyl compound may be at least one selected from styrene; alkyl styrenes such as α-methyl styrene, p-methyl styrene, and p-tert-butyl styrene; p-methoxystyrene; and vinyl naphthalene.

The conjugated diene compound may be at least one selected from butadiene, isoprene, 1,3-pentadiene, methylpentadiene, phenylbutadiene, 3,4-dimethyl-1,3-hexadiene, and 4,5-diethyl-1,3-octadiene.

Examples of the styrene-based thermoplastic elastomer include a styrene-butadiene-styrene copolymer (SBS), a styrene-isoprene-styrene copolymer (SIS), a styrene-ethylene/butylene-styrene copolymer (SEBS), and a styrene-ethylene/propylene-styrene copolymer (SEPS).

The modified elastomer is more preferably a modified product of an olefin-based thermoplastic elastomer, and is at least one selected from an acid anhydride-modified olefin-based elastomer, a carboxylic acid-modified olefin-based elastomer, an epoxy-modified olefin-based elastomer, and an oxazoline-modified olefin-based elastomer. Among them, an acid anhydride-modified olefin-based elastomer and a carboxylic acid-modified olefin-based elastomer are particularly preferred. Hereinafter, they are referred to as "acid-modified olefin-based elastomers".

The acid-modified olefin-based elastomer is preferably an elastomer modified using an acid anhydride or a carboxylic acid so as to have an acid anhydride group or a carboxyl group in the side chain or at the end of its molecule. From the viewpoint of the foam cell stability, impact resistance, and rigidity of the foamed resin molded body, the amount of acid modification, that is, the number of acid anhydride groups or carboxyl groups contained in one molecule of the acid-modified olefin-based elastomer is preferably 1 or more, more preferably 2 to 50, even more preferably 3 to 30, particularly preferably 5 to 20.

Examples of the acid anhydride for acid modification include maleic anhydride, phthalic anhydride, itaconic anhydride, succinic anhydride, glutaric anhydride, adipic anhydride, citraconic anhydride, tetrahydrophthalic anhydride, and butenylsuccinic anhydride. Among them, maleic anhydride, phthalic anhydride, and itaconic anhydride are preferred.

Examples of the carboxylic acid include acrylic acid, methacrylic acid, maleic acid, fumaric acid, itaconic acid, and citraconic acid.

The acid-modified olefin-based elastomer is preferably an elastomer modified with an acid anhydride, preferably an elastomer modified with maleic anhydride such as a maleic anhydride-modified ethylene-propylene copolymer, a maleic anhydride-modified ethylene-1-butene copolymer, a maleic anhydride-modified ethylene-1-hexene copolymer, a maleic anhydride-modified ethylene-1-octene copolymer, and a maleic anhydride-modified propylene-1-butene copolymer.

These acid-modified olefin-based elastomers may be used singly or in combination of two or more of them.

As a compound for modification to be used for obtaining the epoxy-modified olefin-based elastomer as another modified elastomer, a compound can be used which has a polymerizable unsaturated bond and an epoxy bond such as a glycidyl ester of $\alpha,\beta$-unsaturated acid.

Further, as a compound for modification to be used for obtaining the oxazoline-modified olefin-based elastomer, a compound can be used which has a polymerizable unsaturated bond and an oxazolyl group such as a vinyl oxazoline compound.

The weight-average molecular weight (based on polystyrene standards) of the modified elastomer measured by GPC is preferably 10,000 to 500,000, more preferably 35,000 to 500,000, even more preferably 35,000 to 300,000.

When the total of the polyamide resin, the modified elastomer, and the olefin resin contained in the foamed resin molded body (olefin-based resin composition) is taken as 100% by mass, the content of the polyamide resin is preferably 0.3 to 60% by mass, preferably 0.5 to 55% by mass, more preferably 1 to 50% by mass, even more preferably 1.5 to 40 mass %, even more preferably 2 to 30% by mass, particularly preferably 2.5 to 20% by mass, most preferably 3 to 15% by mass. Further, the content of the modified elastomer is preferably 0.2 to 55% by mass, preferably 0.4 to 50% by mass, more preferably 0.8 to 45% by mass, even more preferably 1.2 to 35% by mass, even more preferably 1.5 to 25% by mass, particularly preferably 1.8 to 17% by mass, most preferably 2 to 12% by mass. Further, the content of the olefin resin is preferably 50 to 99.5% by mass, more preferably 57 to 98% by mass, even more preferably 62 to 96% by mass, even more preferably 67 to 95% by mass, particularly preferably 72 to 94% by mass, most preferably 75 to 93% by mass.

The dispersed phase (Y) is obtained by melt-kneading the polyamide resin (B) and the modified elastomer, and when the total of both the polyamide resin (B) and the modified elastomer is taken as 100% by mass, the ratio between the amount of the polyamide resin (B) and the amount of the modified elastomer is preferably 10 to 80% by mass:20 to 90% by mass, more preferably 12 to 78% by mass:22 to 88% by mass, even more preferably 14 to 75% by mass:25 to 86% by mass, even more preferably 20 to 70% by mass:30 to 80% by mass, particularly preferably 50 to 65% by mass:35 to 50% by mass.

The dispersed phase (Y) preferably has a structure in which a fine dispersed phase ($Y_2$) composed of a reaction product between part of the polyamide resin (B) and the modified elastomer is contained in a matrix phase ($Y_1$) containing the polyamide resin (B) (see FIG. 1). The matrix phase ($Y_1$) may be a phase composed of only the polyamide resin (B) or may further contain another resin (other than the olefin resin (A)) depending on the purpose, intended use, etc. The other resin is preferably a resin that is compatible with the polyamide resin (B) but incompatible with the polyolefin resin (A). The structure of the matrix phase is not particularly limited, and may be either a crosslinked structure or a non-crosslinked structure.

In the foamed resin molded body (1) according to the present invention, the olefin resin constituting the continuous phase (X) is foamed. More specifically, the foamed resin molded body (1) includes an olefin-based resin composition, and the olefin-based resin composition has a continuous phase (X) and a dispersed phase (Y) dispersed in the continuous phase (X). Further, the olefin-based resin composition contains gas bubbles (Z). The gas bubbles (Z) may be located anywhere, but are preferably present in the continuous phase (X). In this case, it can also be said that the dispersed phase (Y) and the gas bubbles (Z) are dispersed in the continuous phase (X). Further, the foamed resin molded body (1) is particularly preferably one in which the dispersed phase (Y) has a matrix phase (Y) containing the polyamide resin and a fine dispersed phase ($Y_2$) dispersed in the matrix phase ($Y_1$) and containing the elastomer, and the air bubbles (Z) formed by foaming are present not in the dispersed phase (Y) and the fine dispersed phase ($Y_2$) but only in the continuous phase (X) (see FIG. 1). The foamed resin molded body according to the present invention having such a structure is obtained by foaming the olefin-based resin composition in a state where a phase structure (salami structure) such as a dispersed phase (Y) or a fine dispersed phase ($Y_2$) is maintained, and therefore has excellent impact resistance.

Further, the general form of the dispersed phase (Y) and the fine dispersed phase ($Y_2$) is not particularly limited. For example, as shown in FIG. 1(a), the dispersed phase (Y) and the fine dispersed phase ($Y_2$) may have a substantially circular cross-sectional shape (substantially spherical three-dimensional shape), or as shown in FIG. 1(b), the dispersed phase (Y) and the fine dispersed phase ($Y_2$) may have a deformed (elongated) shape such as a substantially elliptical shape or a flattened shape due to the formation of gas bubbles (Z).

The foamed resin molded body according to the present invention may have, as a phase structure, a co-continuous phase having a continuous phase A1 composed of a first resin and a continuous phase A2 composed of a second resin. The co-continuous phase refers to a structure in which two or more continuous phases (continuous phase A1 and continuous phase A2) are three-dimensionally and continuously connected.

The matrix phase ($Y_1$) contains a fine dispersed phase ($Y_2$) composed of a melt-kneaded product of the polyamide resin (B) and the modified elastomer.

The reaction product constituting the fine dispersed phase ($Y_2$) is an equimolar reaction product of the reactive group contained in the modified elastomer and the amide bond of the polyamide resin. The shape and size of the fine dispersed phase ($Y_2$) are not particularly limited, but from the viewpoint of foam cell stability, impact resistance, and rigidity of the foamed resin molded body, the average diameter (average particle diameter) of the fine dispersed phase ($Y_2$) is 5 to 1200 nm, preferably 5 to 1000 nm, more preferably 5 to 600 nm, even more preferably 10 to 400 nm, particularly preferably 15 to 350 nm. It is to be noted that the average diameter of the fine dispersed phase ($Y_2$) can be determined as a measured value obtained from an electron microscope image or the like. More specifically, 20 particles of the fine dispersed phase ($Y_2$) are randomly selected from a predetermined region in an image magnified 1000 times or more which will be described later, the longest diameter of each of the particles is measured, and the average of the measured longest diameters is determined as a first average value. Such measurement is performed in 5 different regions in the image to determine first average values, and the average of these first average values is further determined as the above-described average diameter of the fine dispersed phase ($Y_2$) (major-axis average dispersion diameter). The magnified image to be used may be one obtained by magnifying the osmium-coated surface of a test piece (test piece of the foamed resin molded body) subjected to oxygen plasma etching and then further osmium coating with the use of a field emission scanning electron microscope (FE-SEM).

The dispersed phase may be either one containing only the fine dispersed phase or one further containing an elastomer component. The elastomer component to be used may be a styrene-based elastomer, a non-modified olefin elastomer, or the like.

The dispersed phase may contain an additive, which will be described later, in a dispersed state.

The dispersed phase may have a definite shape such as a spherical shape or an oval spherical shape or a deformed shape thereof (indefinite shape), and may have depressions or projections in its surface.

From the viewpoint of shape stability, impact resistance, and rigidity of the foamed resin molded body, the upper limit of maximum diameter of the dispersed phase is preferably 10,000 nm, more preferably 8,000 nm, even more preferably 4,000 nm. Further, the lower limit of maximum diameter of the dispersed phase is usually 50 nm, preferably 100 nm. The maximum diameter can be determined as a measured value obtained from an electron microscope image.

The olefin-based resin composition has a continuous phase and a dispersed phase dispersed in the continuous phase.

From the viewpoint of foam cell stability, impact resistance, and rigidity of the foamed resin molded body, when the total of both the continuous phase and the dispersed phase is taken as 100% by mass, the mass ratio between the continuous phase and the dispersed phase is preferably 30% by mass or more: 70% by mass or less, more preferably 50 to 99.5% by mass:0.5 to 50% by mass, even more preferably 52 to 98% by mass:2 to 48% by mass, particularly preferably 55 to 96% by mass:4 to 45% by mass.

In the foamed resin molded body according to the present invention, the dispersed phase may be contained in the continuous phase as it is, or may be contained in the continuous phase in a state where a modified layer is provided in at least part of the interface between the continuous phase and the dispersed phase.

The modified layer may be composed of a modified elastomer or a styrene-based elastomer. These materials may be those mentioned above. The thickness of the modified layer is not particularly limited.

The foamed resin molded body according to the present invention includes a skin layer and a cell wall which are made of the olefin-based resin composition. The thickness of the skin layer is not particularly limited, but is preferably 0.2 to 0.8 mm, more preferably 0.3 to 0.6 mm from the viewpoint of foam cell stability, impact resistance, and rigidity of the foamed resin molded body.

Examples of the additive that can be contained in the continuous phase or the dispersed phase include a nucleating agent, an antioxidant, a heat stabilizer, a weathering agent, a light stabilizer, a plasticizer, an ultraviolet absorber, an antistatic agent, a flame retardant, a slip agent, an anti-blocking agent, an anti-fogging agent, a lubricant, a pigment, a dye, a dispersant, a copper damage inhibitor, a neutralizer, an anti-foaming agent, a weld strength improver, a natural oil, a synthetic oil, and a wax.

Examples of the nucleating agent include: silicates such as talc, silica, clay, montmorillonite, and kaolin; carbonates such as calcium carbonate, lithium carbonate, and magnesium carbonate; metal oxides such as alumina, titanium oxide, and zinc oxide; metals such as aluminum, iron, silver, and copper; hydroxides such as aluminum hydroxide and magnesium hydroxide; sulfides such as barium sulfate; carbides such as charcoal and bamboo charcoal; titanides such as potassium titanate and barium titanate; celluloses such as cellulose microfibril and cellulose acetate; resin fibers such as polyethylene terephthalate fibers, nylon fibers, polyethylene naphthalate fibers, aramid fibers, vinylon fibers, and polyarylate fibers; and carbons such as fullerene and carbon nanotubes.

Examples of the antioxidant include a phenol-based compound, an organic phosphite-based compound, and a thio-ether-based compound.

Examples of the heat stabilizer include a hindered amine compound and the like.

Examples of the ultraviolet absorber include a benzophenone-based compound, a benzotriazole-based compound, and a benzoate-based compound.

Examples of the antistatic agent include a nonionic compound, a cationic compound, and an anionic compound.

Examples of the metal deactivator include a hydrazine-based compound and an amine-based compound.

Examples of the flame retardant include a halogen-based compound, a phosphorus-based compound (e.g., a nitrogen-containing phosphate compound, a phosphate ester), a nitrogen-based compound (e.g., guanidine, triazine, melamine, or a derivative thereof), an inorganic compound (e.g., a metal hydroxide), a boron-based compound, a silicone-based compound, a sulfur-based compound, and a red phosphorus-based compound.

Examples of the flame retardant aid include an antimony compound, a zinc compound, a bismuth compound, magnesium hydroxide, and a clayey silicate.

It can be said that the foamed resin molded body according to the present invention is one obtained by foaming the above-described olefin-based resin composition. That is, the foamed resin molded body according to the present invention can be obtained by, for example, chemical foaming or physical foaming of the olefin-based resin composition using a foaming agent. The foamed resin molded body may be obtained by any foaming method, and a conventionally-known method may be used. When a foaming agent is used, the foaming agent may be either a decomposable foaming agent or a volatile foaming chemical (including a volatile foaming agent) as long as it is a conventionally-known one. Specific compounds will be described in "2. Method for manufacturing foamed resin molded body".

The expansion ratio of the foamed resin molded body according to the present invention is preferably 1.2 to 3.5 times, more preferably 1.3 to 2.5 times, even more preferably 1.4 to 2.0 times, particularly preferably 1.5 to 1.8 times. Further, the mass per unit area of the foamed resin molded body according to the present invention is preferably 0.1 to 2.1 $g/m^2$, more preferably 0.5 to 2.0 $g/m^2$, even more preferably 0.8 to 1.9 $g/m^2$, particularly preferably 1.0 to 1.8 $g/m^2$.

It is to be noted that when the solid part volume and the hollow part volume of the foamed resin molded body are defined as $V_0$ and $V_1$, respectively, the expansion ratio is represented as "$(V_0+V_1)/V_0$". That is, the solid part volume $V_0$ and the hollow part volume $V_1$ can be explained using the phase structure as follows. The total volume of the continuous phase (X) and the dispersed phase (Y) corresponds to the solid part volume $V_0$, and the volume of the gas bubbles (Z) corresponds to the hollow part volume $V_1$.

The foamed resin molded body according to the present invention preferably has closed foam cells, and a decomposed gas or volatile gas from the foaming agent is usually contained in the inside of foam cells formed by the skin layer and the cell wall.

The size of the foam cells is not particularly limited, but the foamed resin molded body according to the present invention has fine foam cells of uneven sizes.

2. Method for Manufacturing Foamed Resin Molded Body

A method for manufacturing a foamed resin molded body according to the present invention includes foaming a manufacturing material obtained by a method (preparation method) including a first melt-kneading step in which a polyamide resin and an elastomer (modified elastomer) having a reactive group that reacts with the polyamide resin are melt-kneaded and a second melt-kneading step in which a first melt-kneaded product obtained in the first melt-kneading step and an olefin resin are melt-kneaded. The foaming in this manufacturing method may be, for example, either chemical foaming or physical foaming as long as the manufacturing material is finally foamed. If necessary, this manufacturing method may further include the step of adding another component.

The manufacturing material is preferably a composition mainly containing a thermoplastic resin and containing a foaming agent for chemical foaming or a foaming agent for physical foaming (both of which will be described later).

Further, when additives are excluded, a particularly preferred manufacturing material has the same composition as the above-described olefin-based resin composition constituting the foamed resin molded body according to the present invention. In this case, the manufacturing material may contain another resin.

The first melt-kneading step is preferably a step in which a first raw material containing a polyamide resin and a modified elastomer is melt-kneaded. The first raw material may further contain another resin, an additive, etc.

The modified elastomer is preferably a modified product of an olefin-based thermoplastic elastomer, particularly preferably a modified product of an α-olefin-based copolymer containing a structural unit derived from an α-olefin having 3 to 8 carbon atoms (e.g., an acid anhydride-modified olefin elastomer, a carboxylic acid-modified olefin elastomer, an epoxy-modified olefin elastomer, an oxazoline-modified olefin elastomer), and those described above can be applied.

It is to be noted that the performance of the polyamide resin may be different depending on its type, and a preferred amount of the polyamide resin to be used for obtaining the effect of the present invention will be described below.

When polyamide 6 is used as the polyamide resin, the amount thereof to be used is preferably 1 to 50% by mass, more preferably 5 to 40% by mass, even more preferably 10 to 35% by mass per 100% by mass of the total of the polyamide resin, the modified elastomer, and the olefin resin.

When polyamide 610 is used as the polyamide resin, the amount thereof to be used is preferably 1 to 40% by mass, more preferably 5 to 40% by mass, even more preferably 10 to 40% by mass per 100% by mass of the total of the polyamide resin, the modified elastomer, and the olefin resin.

When polyamide 11 is used as the polyamide resin, the amount thereof to be used is preferably 1 to 55% by mass, more preferably 10 to 55% by mass, even more preferably 15 to 55% by mass per 100% by mass of the total of the polyamide resin, the modified elastomer, and the olefin resin.

When polyamide 12 is used as the polyamide resin, the amount thereof to be used is preferably 1 to 35% by mass, more preferably 5 to 35% by mass, even more preferably 10 to 35% by mass per 100% by mass of the total of the polyamide resin, the modified elastomer, and the olefin resin.

When polyamide 1010 is used as the polyamide resin, the amount thereof to be used is preferably 1 to 55% by mass, more preferably 5 to 55% by mass, even more preferably 10 to 55% by mass per 100% by mass of the total of the polyamide resin, the modified elastomer, and the olefin resin.

When polyamide 10T is used as the polyamide resin, the amount thereof to be used is preferably 1 to 45% by mass, more preferably 5 to 45% by mass, even more preferably 10 to 45% by mass per 100% by mass of the total of the polyamide resin, the modified elastomer, and the olefin resin.

When the polyamide MXD6 is used as the polyamide resin, the amount thereof to be used is preferably 1 to 40% by mass, more preferably 5 to 40% by mass, even more preferably 10 to 40% by mass per 100% by mass of the total of the polyamide resin, the modified elastomer, and the olefin resin.

The second melt-kneading step is a step in which a second raw material containing a first melt-kneaded product obtained in the first melt-kneading step and an olefin resin are melt-kneaded. The second raw material may further contain another resin, an additive, etc.

As the olefin resin, the above-described olefin resin (A) may directly be used, or a mixed resin, such as one known as "block-type polypropylene", may be used which is composed of polypropylene, polyethylene, and ethylene-propylene rubber (non-modified olefin elastomer) because the olefin resin (A) is preferably polypropylene or an ethylene-propylene copolymer. The block-type polypropylene (i.e., propylene block polymer) may also be referred to as an impact copolymer, a polypropylene impact copolymer, heterophasic polypropylene, or heterophasic block polypropylene.

In both the first melt-kneading step and the second melt-kneading step, melt-kneading can be performed using a kneading device such as an extruder (e.g., a single-screw extruder, a twin-screw kneading extruder), a kneader, or a mixer (e.g., a high-speed fluidized mixer, a paddle mixer, a ribbon mixer).

In the first melt-kneading step, melt-kneading of the polyamide resin and the modified elastomer may be performed by adding all of them at once or by adding one of them to the other in several batches. It is to be noted that the kneading temperature is preferably 190° C. to 250° C., more preferably 200° C. to 230° C., even more preferably 205° C. to 220° C.

In the second melt-kneading step, melt-kneading of the second raw material containing the first melt-kneaded product and the olefin resin may be performed by adding all of them at once or by adding one of them to the other in several batches. It is to be noted that the kneading temperature is preferably 190° C. to 250° C., more preferably 200° C. to 230° C., even more preferably 205° C. to 220° C.

The ratio among the polyamide resin, the modified elastomer, and the olefin resin to be used in this method is not particularly limited. For example, the polyamide resin, the modified elastomer, and the olefin resin may be blended so that the ratio of each of the components is the same as the ratio of each of the polyamide resin, the modified elastomer, and the olefin resin contained in the above-described foamed resin molded body (olefin-based resin composition) per 100% by mass of the total of them. On that basis, the amount of each of the polyamide resin, the modified elastomer, and the olefin resin to be used as main components of the manufacturing material obtained through the first melt-kneading step and the second melt-kneading step is as follows. When the total of them is taken as 100% by mass, the amount of the polyamide resin to be used is preferably 1 to 60% by mass, more preferably 3 to 50% by mass, even more preferably 5 to 45% by mass, even more preferably 7 to 40% by mass, particularly preferably 9 to 35% by mass, most preferably 12 to 30% by mass, and the amount of the modified elastomer to be used is preferably 1 to 70% by mass, more preferably 2 to 65% by mass, even more preferably 3 to 60% by mass, even more preferably 5 to 55% by mass, even more preferably 7 to 50% by mass, particularly preferably 13 to 47% by mass, most preferably 17 to 45% by mass.

As the manufacturing material, a composition obtained through the first melt-kneading step and the second melt-kneading step can be used, but a mixture may be used which is obtained by performing the step of mixing a second melt-kneaded product obtained in the second melt-kneading step and an olefin resin (hereinafter, referred to as a "mixing step") after the second melt-kneading step. Further, when a foaming agent is used, in this mixing step, the second melt-kneaded product and one of the olefin resin and the foaming agent may be mixed, or the second melt-kneaded product and both of the olefin resin and the foaming agent may be mixed. The olefin resin used in the mixing step may be the same as or different from the olefin resin used in the second melt-kneading step. That is, the foamed resin molded body according to the present invention may be obtained by foaming he above-described olefin-based resin composition. Alternatively, the foamed resin molded body according to the present invention may be obtained by foaming a mixture obtained by adding part of the olefin resin contained in the above-described olefin-based resin composition later. Further, as described above, the mixing step is the step of mixing a second melt-kneaded product and an olefin resin, and when a foaming agent is used, the second melt-kneaded product, the olefin resin (olefin resin to be added later), and the foaming agent may directly be mixed (dry-blended) in the mixing step, or the second melt-kneaded product may be mixed (dry-blended) in the mixing step with, for example, a foaming agent-containing olefin resin to be added later which is obtained by previously blending (kneading) a foaming agent into the olefin resin to be added later.

It is to be noted that "olefin resins different from each other" means olefin resins different in type from each other or olefin resins that are of the same type but are different in flowability etc. from each other. When olefin resins different from each other are used, the olefin resin used in the mixing step preferably has higher flowability than the olefin resin used in the second melt-kneading step regardless of whether or not these olefin resins are of the same type.

The above-described difference in flowability can be evaluated by comparison of flowability measurements measured at a certain temperature and a shear rate of 0 $\sec^{-1}$. More specifically, the difference in flowability can be evaluated by comparison of MFR (temperature 230° C., load 2.16 kg). That is, it can be said that an olefin resin having a relatively larger MFR value than the other olefin resin as a target for comparison has higher flowability than the other olefin resin. Further, it can be said that an olefin resin having a relatively smaller MFR value than the other olefin resin as a target for comparison has lower flowability than the other olefin resin. The difference in MFR (temperature 230° C., load 2.16 kg) is not particularly limited, but may be 15 g/10 min or more (usually, 60 g/10 min or less). Further, the specific range of these MFR values is not particularly limited, but for example, an olefin resin having an MFR value (temperature 230° C., load 2.16 kg) of 30 g/10 min or less (usually, 1 g/10 min or more) can be used as a low-flowable olefin resin. On the other hand, an olefin resin having an MFR value (temperature 230° C., load 2.16 kg) of 45 g/10 min or more (usually, 90 g/10 min or less) can be used as a high-flowable olefin resin. Further, a propylene homopolymer may be used as a low-flowable olefin resin, and a propylene block polymer may be used as a high-flowable olefin resin. As described above, the use of a combination of a high-flowable olefin resin and a low-flowable olefin resin as the olefin resin makes it possible to control and improve foam moldability to obtain a foamed molded body.

When both the olefin resin and the foaming agent are used in the mixing step, the method according to the present invention is particularly suitable as a manufacturing method using chemical foaming. The use of a manufacturing material obtained by dry-blending the second melt-kneaded product, the olefin resin, and the foaming agent makes it possible to efficiently manufacture a foamed resin molded body having the effect of the present invention.

The ratio among the polyamide resin, the modified elastomer, and the olefin resin to be used in this method is not particularly limited. For example, the polyamide resin, the modified elastomer, and the olefin resin may be blended so that the ratio of each of the components is the same as the ratio of each of the polyamide resin, the modified elastomer, and the olefin resin contained in the above-described foamed resin molded body (olefin-based resin composition) per 100% by mass of the total of them. On that basis, when an olefin resin is used in the mixing step, the mass ratio of each of the polyamide resin, the modified elastomer, and the olefin resin constituting the manufacturing material is as follows from the viewpoint of foam moldability. When the total of them is taken as 100% by mass, the ratio of the polyamide resin is preferably 0.5 to 30% by mass, more preferably 1 to 22% by mass, even more preferably 2 to 15% by mass, and the ratio of the modified elastomer is preferably 0.5 to 30% by mass, more preferably 1 to 22% by mass, even more preferably 2 to 15% by mass.

Further, the amount of the foaming agent to be used is preferably 0.1 to 10 parts by mass, more preferably 0.5 to 8 parts by mass, even more preferably 1 to 6 parts by mass per 100 parts by mass of the total of the polyamide resin, the modified elastomer, and the olefin resin. It is to be noted that the foaming agent is preferably a decomposable foaming agent which will be described later.

Then, a predetermined manufacturing material is foamed to obtain a foamed resin molded body.

The manufacturing material can be foamed using a conventionally-known method such as an injection foam molding, press foam molding, extrusion foam molding, stampable foam molding, or heat foam molding. In the present invention, injection foam molding is preferred.

Hereinafter, a method for manufacturing a foamed resin molded body by injection foam molding will be described in detail. The manufacturing method according to the present invention may use any foaming method. However, when a foamed resin molded body is manufactured by chemical foaming, a manufacturing material containing a decomposable foaming agent is used. On the other hand, when a foamed resin molded body is manufactured by physical foaming, a manufacturing material is used which contains a volatile foaming chemical or capsules filled with a volatile foaming chemical. Further, a gas in an atmosphere can be introduced as gas bubbles into the manufacturing material by mechanical stirring.

The decomposable foaming agent is preferably one that decomposes or reacts when the cylinder temperature of an injection molding machine, to which the manufacturing material containing the decomposable foaming agent and being in a non-molten state has been supplied, is equal to or higher than the melting temperature of the olefin resin, particularly preferably one that produces carbon dioxide or nitrogen. In the present invention, either an inorganic foaming agent or an organic foaming agent may be used. Alternatively, they may be used in combination.

Examples of the inorganic foaming agent include sodium bicarbonate (sodium hydrogen carbonate), sodium carbonate, ammonium bicarbonate (ammonium hydrogen carbonate), ammonium carbonate, and ammonium nitrite.

Examples of the organic foaming agent include: N-nitroso compounds such as N,N'-dinitrosoterephthalamide and N,N'-dinitrosopentamethylenetetramine; azo compounds such as azodicarbonamide, azobisisobutyronitrile, azocyclohexylnitrile, azodiaminobenzene, and barium azodicarboxylate; sulfonylhydrazide compounds such as benzenesulfonylhydrazide, toluenesulfonylhydrazide, p,p'-oxybis (benzenesulfenylhydrazide), and diphenylsulfone-3,3'-disulfonylhydrazide; azide compounds such as calcium azide, 4,4'-diphenyldisulfonyl azide, and p-toluenesulfonyl azide; and polycarboxylic acids and salts thereof such as citric acid, sodium citrate, tartaric acid, malic acid, succinic acid, oxalic acid, adipic acid, malonic acid, phthalic acid, sebacic acid, maleic acid, fumaric acid, malonic acid, itaconic acid, glutaric acid, gluconic acid, glutaconic acid, and pentenedioic acid.

The volatile foaming chemical is evaporated in a mold when the manufacturing material prepared by allowing the volatile foaming chemical to be absorbed into or dissolved in the olefin-based resin composition in a molten state is supplied to an injection molding machine. Examples of the volatile foaming chemical to be used in the present invention include: an inert or non-flammable gas (e.g., nitrogen, carbon dioxide, argon, neon, helium); water; an aliphatic hydrocarbon such as propane, n-butane, isobutane, n-pentane, isopentane, or n-hexane; an aromatic hydrocarbon such as toluene; a halogenated hydrocarbon such as trichlorofluoromethane; an ether such as dimethyl ether or petroleum ether; and a ketone such as acetone. Among them, carbon dioxide, nitrogen, and a mixture of them are preferred because they are inexpensive and have high safety. Further, carbon dioxide in a super critical state, nitrogen in a super critical state, and a mixture of them are more preferred because they have compressibility like liquid and diffusibility like gas, and therefore high diffusibility and high solubility of gas in the resin can be achieved, and further small-sized foam cells can be formed, and a higher expansion ratio can be achieved.

Further, the capsule filled with a volatile foaming chemical to be used may be, for example, a material called a microballoon or a hollow balloon. A specific example of such a capsule includes a capsule obtained by encapsulating the above-described volatile foaming chemical in an outer skin made of a thermoplastic resin composition having a gas barrier property (e.g., polyacrylonitrile).

The amount of the foaming agent to be used is preferably 0.1 to 10 parts by mass, more preferably 0.5 to 8 parts by mass, even more preferably 1 to 6 parts by mass per 100 parts by mass of the total amount of resin components contained in the manufacturing material.

The injection foam molding can be performed by a method such as a method (1) in which a resin in a foamable state (e.g., a resin containing a foaming agent) is injected into the cavity of a mold, and then the capacity of the cavity is increased by moving the cavity wall of the mold backward to foam the resin in the mold (core-back method), a method (2) in which the cavity of a mold is completely filled with a resin in a foamable state at the time just after the completion of filling of the cavity with the resin, and the resin is expanded to compensate for a reduction in the volume of the resin caused by shrinkage during cooling (full-pack method), a method (3) in which a resin in a foamable state having a volume smaller than the capacity of cavity of a mold is injected and then expanded to fill the cavity of the mold with the resin (short-shot method), or a method (4) in which a resin in a foamable state is injected into the cavity of a mold equipped with a hydraulic device, and part of the cavity wall of the mold is moved backward by the hydraulic device to expand the resin in the mold.

In the present invention, the core-back method is preferred from the viewpoint that a foamed resin molded body having a skin layer can be easily obtained and the expansion ratio of a whole foamed resin molded body can be easily controlled.

Figure 2:
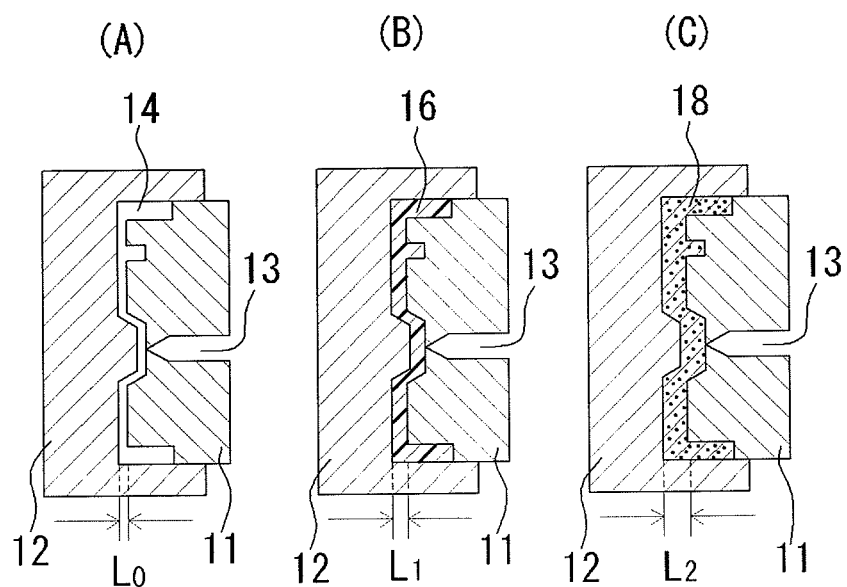
FIG. 2 is a schematic cross-sectional view showing a method for producing a foamed resin molded body by injection foam molding.

A manufacturing method based on the core-back method will be described with reference to FIG. 2.

FIG. 2(A) is a schematic view of a mold having a fixed mold 11, a movable mold 12, and a sprue 13, wherein the fixed mold 11 and the movable mold 12 are closest to each other in a mold-clamped state. The fixed mold 11 and the movable mold 12 are arranged so that a cavity 14 (clearance $L_0$) is formed which has a capacity smaller than the total volume of a manufacturing material to be used for molding. Then, a predetermined amount of the manufacturing material is introduced (injected) from the sprue 13 into the cavity 14 while the movable mold 12 is moved backward to complete the filling of the cavity 14 with the manufacturing material (FIG. 2(B)). As a result, a skin layer is earlier formed as compared to when injection of the manufacturing material is started from the state of clearance $L_1$ so that a foamed resin molded body having excellent appearance can be obtained.

The temperature of the manufacturing material to be injected is preferably 180° C. to 240° C., more preferably 200° C. to 230° C., even more preferably 210° C. to 220° C. The temperature of the fixed mold 11 and the movable mold 12 is preferably 10° C. to 80° C., more preferably 20° C. to 70° C., even more preferably 30° C. to 50° C.

When injected at an injection pressure higher than a mold clamping pressure, the length of the cross-section of the cavity 14 (clearance) is increased as the cavity 14 is filled with the manufacturing material. The control of the length of cross-section of the cavity may be performed by allowing the mold to passively open at the time when the mold clamping pressure succumbs to the injection pressure or by actively controlling the change rate of the length of cross-section of the cavity.

The injection pressure and the filling pressure are exerted on the manufacturing material during supply to the cavity 14, and therefore foaming does not occur at all or hardly occurs.

Then, the movable mold 12 is further moved backward to foam the manufacturing material. At this time, the manufacturing material is not further injected, and therefore the pressure inside the cavity 14 is reduced, and foam molding proceeds as the movable mold 12 moves. It is to be noted that the manufacturing material in a portion in contact with the inner surfaces of the fixed mold 11 and the movable mold 12 is cooled, and therefore foaming does not occur at all or hardly occurs, and a skin layer is formed and the inside (core layer) of a manufacturing material part 16 is foamed so that a foamed resin molded body 18 is formed (FIGS. 2(B) and 2(C)).

The end point of backward movement of the movable mold 12 can be determined on the basis of the expansion ratio of the foamed resin molded body 18. That is, when the foamed resin molded body 18 is manufactured to have a high expansion ratio, the distance of backward movement is increased. In general, the expansion ratio is difficult to adjust in foam molding because the core layer of the foamed resin molded body 18 is less likely to be cooled but the skin layer is early cooled. However, the expansion ratio can be increased by performing injection foam molding using the manufacturing material according to the present invention under the above-described preferred conditions, and therefore it is possible to efficiently obtain a foamed resin molded body 18 having no deformation strain and excellent appearance, that is, a foamed resin molded body 18 having a shape based on a cavity formed by the fixed mold 11 and the movable mold 12 after the completion of backward movement.

Then, the mold is opened to collect the foamed resin molded body 18.

As described above, in the case of the manufacturing method in which the manufacturing material is injected into the cavity 14 to fill the cavity 14 with the manufacturing material while the movable mold 12 is moved backward from the state of clearance $L_0$, the filling of the cavity 14 with the manufacturing material by injection is started from a state where the capacity of the cavity 14 is small. Therefore, the flow rate of the manufacturing material in the cavity 14 is high, blowing of foaming gas during flowing, which causes silver streaks, is prevented, and the manufacturing material in contact with the inner surfaces of the fixed mold 11 and the movable mold 12 is quickly filled and cooled so that a foamed resin molded body 18 can be obtained which has a skin layer excellent in appearance and is hardly fractured even when subjected to high impact.

Another method for manufacturing a foamed resin molded body is a method using a high-pressure gas as a foaming agent. Examples of such a method include a batch-type manufacturing method in which an olefin-based resin composition is molded into a shape such as a sheet-like shape to obtain a non-foamed resin molded body (non-foamed molded body), and then the non-foamed resin molded body is impregnated with a high-pressure gas and foamed by releasing the pressure, and a continuous manufacturing method in which an olefin-based resin composition is kneaded with a high-pressure gas under pressure and then molded while the pressure is released to perform molding and foaming at the same time.

When a foamed resin molded body is manufactured by a batch-type manufacturing method, it is preferred that a gas impregnation step in which a high-pressure gas composed of an inert gas such as carbon dioxide is injected (introduced) into a pressure-resistant container (high-pressure container), in which a non-foamed resin molded body is placed, to impregnate the non-foamed resin molded body with the high-pressure gas, a decompression step in which the pressure is released (usually to the atmospheric pressure) at the time when the non-foamed resin molded body is sufficiently impregnated with the high-pressure gas to generate bubble nuclei in the non-foamed resin molded body, and if necessary, a heating step in which the bubble nuclei are grown by heating be performed in this order to form gas bubbles in the non-foamed resin molded body. It is to be noted that the bubble nuclei may be grown at room temperature without performing the heating step. After the gas bubbles are grown in such a manner, the shape of the foamed resin molded body may be fixed, if necessary, by quick cooling with cold water or the like.

When a foamed resin molded body is manufactured by a continuous manufacturing method, a kneading and impregnation step in which a manufacturing material (resin composition) containing no foaming agent is kneaded using an extruder while a high-pressure gas composed of an inert gas such as carbon dioxide is injected (introduced) into the manufacturing material to obtain a kneaded product impregnated with the high-pressure gas and a molding and decompression step in which the kneaded product is extruded through a die or the like provided at the tip of the extruder to release the pressure (usually to the atmospheric pressure) so that molding and foaming are performed at the same time can be performed in this order. In this molding and decompression step, gas bubbles may be grown by heating, if necessary. After the gas bubbles are grown in such a manner, the shape of the foamed resin molded body may be fixed, if necessary, by quick cooling with cold water or the like.

3. Uses of Foamed Resin Molded Body

The foamed resin molded body according to the present invention is suitable for vehicle parts (for automobiles and bicycles), ship parts, aircraft parts, industrial materials, office equipment parts, daily necessities, toys, sporting goods, building material parts, structures, medical supplies, and agriculture-, forestry-, and fishery-related parts, etc. As for vehicle parts, ship parts, and aircraft parts, the foamed resin molded body according to the present invention is suitable as exterior parts, interior parts, and base materials thereof.

Examples of automobile-related parts among the vehicle parts include: exterior parts such as body panels and bumpers; interior parts such as door trims, pockets, decorative panels, ornament panels, EA materials, quarter trims, pillar garnishes, cowl side garnishes, shields, back boards, side air-bag peripheral parts, instrument panels, center clusters, registers, center boxes (doors), glove doors, center consoles, overhead consoles, sun visors, deck boards (luggage boards), package trays, high mount stop lamp covers, CRS covers, seat side garnishes, CTR clusters, and shock absorbers; and electrical parts such as cleaner cases and filter cases.

Examples of the industrial materials include transport containers, trays, carts, pylons, center poles, and construction equipment.

Examples of the daily necessities include food trays, helmets, shoes, book-slides, dishes, and cleaning tools.

Examples of the sporting goods include protectors (baseball, soccer, motor sports), outdoor goods, and climbing tools.

Examples of the building material parts include heat insulating materials.

Examples of the structures include road signs.

Examples of the medical supplies include mouthpieces, medical devices, and pharmaceutical containers.

Examples of the agriculture-, forestry-, and fishery-related parts include floats, plant pots (planters), and culture fishery-relates tools.

EXAMPLES

1. Preparation of Manufacturing Material for Foamed Resin Molded Body

Preparation Example 1

First, 25 parts by mass of pellets made of a polyamide 11 resin "Rilsan BMN O" (trade name, weight-average molecular weight: 17,000, melting point: 190° C.) manufactured by Arkema and 20 parts by mass of pellets made of a maleic anhydride-modified ethylene-butene copolymer "TAFMER MH7020" (trade name, weight-average molecular weight: 199,000) manufactured by Mitsui Chemicals, Inc. were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (first melt-kneaded product) were obtained using a pelletizer.

Then, 45 parts by mass of the mixed resin pellets (first melt-kneaded product) and 55 parts by mass of a polypropylene resin "NOVATEC MA1B" (trade name, propylene homopolymer, melting point: 165° C., MFR: 21 g/10 min) manufactured by Japan Polypropylene Corporation were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (second melt-kneaded product) were obtained using a pelletizer.

Then, 100 parts by mass of the mixed resin pellets (second melt-kneaded product) and 4 parts by mass of sodium hydrogen carbonate as a foaming agent were dry-blended to obtain a mixture as a manufacturing material (C1).

Preparation Example 2

First, 22.5 parts by mass of pellets made of a polyamide 11 resin "Rilsan BMN O" (trade name, weight-average molecular weight: 17,000, melting point: 190° C.) manufactured by Arkema and 18 parts by mass of pellets made of a maleic anhydride-modified ethylene-butene copolymer ("TAFMER MH7020" (trade name, weight-average molecular weight: 199,000) manufactured by Mitsui Chemicals, Inc. were dry-blended, and then the mixed pellets were fed into a twin-screw melt-kneading extruder (type "ZSK50") manufactured by Coperion and melt-kneaded under conditions of a kneading temperature of 210° C. and an extrusion rate of 150 kg/hr, and a screw rotation speed of 200 rpm. Then, mixed resin pellets (first melt-kneaded product) were obtained using a pelletizer.

Then, 40.5 parts by mass of the mixed resin pellets (first melt-kneaded product) and 49.5 parts by mass of a polypropylene resin "NOVATEC MA1B" (trade name, propylene homopolymer, melting point: 165° C.) manufactured by Japan Polypropylene Corporation were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (second melt-kneaded product) were obtained using a pelletizer.

Then, 90 parts by mass of the mixed resin pellets (second melt-kneaded product), 10 parts by mass of a propylene block polymer (MFR: 50 to 70 g/10 min, melting point: 165° C.), and 4 parts by mass of sodium hydrogen carbonate as a foaming agent were dry-blended to obtain a mixture as a manufacturing material (C2).

It is to be noted that a polypropylene resin used together with a foaming agent in the mixing step may be a polypropylene resin superior in foam moldability to the polypropylene resin "NOVATEC MA1B" (trade name). More specifically, as described above, a polypropylene resin may be used whose MFR (temperature 230° C., load 2.16 kg) is higher by 29 to 49 g/10 min.

Preparation Example 3

First, 10 parts by mass of pellets made of a polyamide 11 resin "Rilsan BMN O" (trade name, weight-average molecular weight: 17,000, melting point: 190° C.) manufactured by Arkema and 8 parts by mass of pellets made of a maleic anhydride-modified ethylene-butene copolymer "TAFMER MH7020" (trade name, weight-average molecular weight: 199,000) manufactured by Mitsui Chemicals, Inc. were dry-blended, and then the mixed pellets were fed into a twin-screw melt-kneading extruder (type "ZSK50") manufacture by Coperion and melt-kneaded under conditions of a kneading temperature of 210° C., an extrusion rate of 150 kg/hr, and a screw rotation speed of 200 rpm. Then, mixed resin pellets (first melt-kneaded product) were obtained using a pelletizer.

Then, 18 parts by mass of the mixed resin pellets (first melt-kneaded product) and 22 parts by mass of a propylene resin "NOVATEC MA1B" (trade name, propylene homopolymer, melting point: 165° C.) manufactured by Japan Polypropylene Corporation were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (second melt-kneaded product) were obtained using a pelletizer.

Then, 40 parts by mass of the mixed resin pellets (second melt-kneaded product), 60 parts by mass of a propylene block polymer (MFR: 50 to 70 g/10 min, melting point: 165° C.), and 4 parts by mass of sodium hydrogen carbonate as a foaming agent were dry-blended to obtain a mixture as a manufacturing material (C3).

Preparation Example 4

First, 5 parts by mass of pellets made of a polyamide 11 resin "Rilsan BMN O" (trade name, weight-average molecular weight: 17,000, melting point: 190° C.) manufactured by Arkema and 4 parts by mass of pellets made of a maleic anhydride-modified ethylene-butene copolymer "TAFMER MH7020" (trade name, weight-average molecular weight: 199,000) manufactured by Mitsui Chemicals, Inc. were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (first melt-kneaded product) were obtained using a pelletizer.

Then, 9 parts by mass of the mixed resin pellets (first melt-kneaded product) and 11 parts by mass of a polypropylene resin "NOVATEC MA1B" (trade name, propylene homopolymer, melting point: 165° C.) were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (second melt-kneaded product) were obtained using a pelletizer.

Then, 20 parts by mass of the mixed resin pellets (second melt-kneaded product), 80 parts by mass of a propylene block polymer (MFR: 50 to 70 g/10 min, melting point: 165° C.), and 4 parts by mass of sodium hydrogen carbonate as a foaming agent were dry-blended to obtain a mixture as a manufacturing material (C4).

Preparation Example 5

First, 3.75 parts by mass of pellets made of a polyamide 11 resin "Rilsan BMN O" (trade name, weight-average molecular weight: 17,000, melting point: 190° C.) and 3 parts by mass of pellets made of a maleic anhydride-modified ethylene-butene copolymer "TAFMER MH7020" (trade name, weight-average molecular weight: 199,000) manufactured by Mitsui Chemicals, Inc. were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (first melt-kneaded product) were obtained using a pelletizer.

Then, 6.75 parts by mass of the mixed resin pellets (first melt-kneaded product) and 8.25 parts by mass of a polypropylene resin "NOVATEC MA1B" (trade name, propylene homopolymer, melting point: 165° C.) manufactured by Japan Polypropylene Corporation were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (second melt-kneaded product) were obtained using a pelletizer.

Then, 15 parts by mass of the mixed resin pellets (second melt-kneaded product), 85 parts by mass of a propylene block polymer (MFR: 50 to 70 g/10 min, melting point: 165° C.), and 4 parts by mass of sodium hydrogen carbonate as a foaming agent were dry-blended to obtain a mixture as a manufacturing material (C5).

Preparation Example 6

First, 2.5 parts by mass of pellets made of a polyamide 11 resin "Rilsan BMN O" (trade name, weight-average molecular weight: 17,000, melting point: 190° C.) manufactured by Arkema and 2 parts by mass of pellets made of a maleic anhydride-modified ethylene-butene copolymer "TAFMER MH7020" (trade name, weight-average molecular weight: 199,000) manufactured by Mitsui Chemicals, Inc. were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (first melt-kneaded product) were obtained using a pelletizer.

Then, 4.5 parts by mass of the mixed resin pellets (first melt-kneaded product) and 5.5 parts by mass of a polypropylene resin "NOVATEC MA1B" (trade name, propylene homopolymer, melting point: 165° C.) manufactured by Japan Polypropylene Corporation were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (second melt-kneaded product) were obtained using a pelletizer.

Then, 10 parts by mass of the mixed resin pellets (second melt-kneaded product), 90 parts by mass of a propylene block polymer (MFR: 50 to 70 g/10 min, melting point: 165° C.), and 4 parts by mass of sodium hydrogen carbonate as a foaming agent were dry-blended to obtain a mixture as a manufacturing material (C6).

Preparation Example 7

First, 1.25 parts by mass of pellets made of a polyamide 11 resin "Rilsan BMN O" (trade name, weight-average molecular weight: 17,000, melting point: 190° C.) manufactured by Arkema and 1 part by mass of pellets made of a maleic anhydride-modified ethylene-butene copolymer "TAFMER MH7020" (trade name, weight-average molecular weight: 199,000) manufactured by Mitsui Chemicals, Inc. were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (first melt-kneaded product) were obtained using a pelletizer.

Then, 2.25 parts by mass of the mixed resin pellets (first melt-kneaded product) and 2.75 parts by mass of a polypropylene resin "NOVATEC MA1B" (trade name, propylene homopolymer, melting point: 165° C.) manufactured by Japan Polypropylene Corporation were dry-blended, and then the mixed pellets were fed into a twin-screw melt-kneading extruder (type "ZSK50") manufactured by Coperion and melt-kneaded under conditions of a kneading temperature of 210° C., an extrusion rate of 150 kg/hr, and a screw rotation speed of 200 rpm. Then, mixed resin pellets (second melt-kneaded product) were obtained using a pelletizer.

Then, 5 parts by mass of the mixed resin pellets (second melt-kneaded product), 95 parts by mass of a propylene block polymer (MFR: 50 to 70 g/10 min, melting point: 165° C.), and 4 parts by mass of sodium hydrogen carbonate as a foaming agent were dry-blended to obtain a mixture as a manufacturing material (C7).

Preparation Example 8

100 parts by mass of pellets made of a polypropylene resin "NOVATEC MA1B" (trade name, propylene homopolymer, melting point: 165° C.) manufactured by Japan Polypropylene Corporation and 4 parts by mass of sodium hydrogen carbonate as a foaming agent were dry-blended to obtain a mixture as a manufacturing material (C8).

2. Production and Evaluation of Foamed Resin Molded Body

Examples 1 to 7 and Comparative Example 1

Each of the above manufacturing materials was subjected to injection foam molding to obtain front door trim base materials having expansion ratios of 1.5 times, 1.8 times, and 2.4 times, respectively. These foamed resin molded bodies of Examples 1 to 7 were subjected to oxygen plasma etching and then osmium coating to obtain test specimens (test specimens of foamed resin molded bodies). Then, the osmium-coated surfaces of the test specimens were observed with a field emission scanning electron microscope (FE-SEM), and as a result, the presence of a continuous phase (X), a dispersed phase (Y), a matrix phase ($Y_1$), and a fine dispersed phase ($Y_2$) was confirmed. Particularly, the dispersed phase and the fine dispersed phase were observed in an image magnified 1000 times or more (usually 10,000 times or less). Further, the component(s) constituting each of the phases was identified by performing energy dispersive X-ray spectrometry (EDS) during the observation using FE-SEM.

Figure 3:
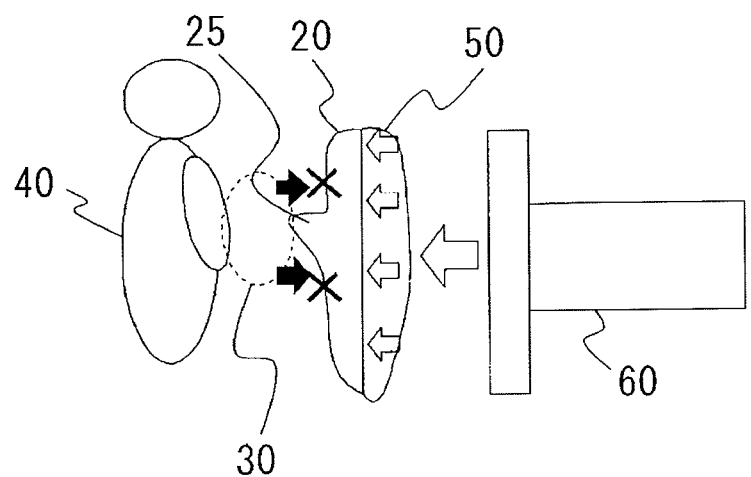
FIG. 3 is a schematic diagram showing the outline of a side-impact test of a front door.

As a crash safety performance test related to vehicle door trims, a side crash test is known in Japan which is performed by Japan New Car Assessment Program (JNCAP) as one of car assessments. FIG. 3 schematically shows the outline of the side crash test performed on a front door. In this test, a dummy 40 called "Euro SID-2" simulating an adult male (with a height of about 170 cm and a weight of about 72 kg) is prepared and placed in the driver's seat of a test car in a resting state, and a moving barrier 60 having a mass of 950 kg is allowed to crash against the side of the test car from the driver's seat side at a speed of 55 km/hr. When the test car is equipped with a side air-bag 30, the side air-bag 30 also operates. The occupant protection performance is evaluated on the basis of the impact on the head, chest, abdomen, and lumbar part of the dummy 40. Currently, it is necessary to ensure occupant protection performance based on such a test. The inventor performed such a test or a single item test equivalent thereto and visually observed whether or not the fracture behavior of a front door trim base material 20 occurred. The observation results were evaluated according to the following criteria and are shown in Table 1.

◯: The fracture behavior of the front door trim base material caused by crash was not observed, or the front door trim base material was fractured but not shattered.

x: The fracture behavior of the front door trim base material caused by crash was observed and the front door trim base material was shattered.

TABLE 1

| | Manufacturing material | Expansion ratio Second melt-kneaded product (% by mass) | Expansion ratio 1.5 times Mass per unit area 1.8 kg/m² | Expansion ratio 1.8 times Mass per unit area 1.5 kg/m² | Expansion ratio 2.4 times Mass per unit area 1.2 kg/m² |
|---|---|---|---|---|---|
| Example 1 | C1 | 100 | ◯ | ◯ | ◯ |
| Example 2 | C2 | 90 | ◯ | ◯ | ◯ |
| Example 3 | C3 | 40 | ◯ | ◯ | ◯ |
| Example 4 | C4 | 20 | ◯ | ◯ | x |
| Example 5 | C5 | 15 | ◯ | ◯ | x |
| Example 6 | C6 | 10 | ◯ | ◯ | x |
| Example 7 | C7 | 5 | ◯ | ◯ | x |
| Comparative Example 1 | C8 | 0 | x | x | x |

The results shown in Table 1 reveal that the door trim base materials are not shattered. That is, the results shown in Table 1 reveal that the foamed resin molded bodies according to the present invention have high impact resistance. More specifically, it has been shown that when the expansion ratio was less than 2.4 times, the fracture behavior of the foamed resin molded bodies was not observed, or the foamed resin molded bodies were not shattered even when fractured. That is, foamed resin molded bodies can be formed even when the blending ratio of the second melt-kneaded product varies in a wide range of 5 to 100% by mass. Further, it has been shown that when the expansion ratio was 2.4 times, the fracture behavior of the foamed resin molded bodies was not observed, or the foamed resin molded bodies were not shattered even when fractured by increasing the blending ratio of the second melt-kneaded product in the corresponding region.

The foregoing examples have been provided merely for the purpose of explanation and are in no way to be construed as limiting of the present invention. Although the present invention has been described with reference to exemplary embodiments, it is understood that the words which have been used in the description and drawings are words of description and illustration, rather than words of limitation. Changes may be made within the scope of the appended claims as described herein without departing from the scope and spirit of the present invention in its aspects. Although the present invention has been described in detail with reference to particular structures, materials, and embodiments, the present invention is not intended to be limited to the particulars disclosed herein; rather, the present invention extends to all functionally-equivalent structures, methods, and uses within the scope of the appended claims.

INDUSTRIAL APPLICABILITY

The foamed resin molded body according to the present invention is suitable for automobile-related parts, ship-related parts, aircraft-related parts, office equipment parts, daily goods, kitchen utensils, building material parts, sporting goods, etc. Particularly, the foamed resin molded body according to the present invention is suitable as exterior materials, interior materials, and base materials thereof of automobile-related parts, ship-related parts, and aircraft-related parts.

REFERENCE SIGNS LIST

1; Foamed resin molded body
11: Fixed mold
12: Movable mold
13: Sprue
14: Cavity
16: Manufacturing material part
18: Foamed resin molded body
20: Front door trim base material
25: Armrest part
30: Side air-bag
40: Dummy
50: Door panel
60: Moving barrier
X; Continuous phase
Y; Dispersed phase
$Y_1$; Matrix phase (continuous phase in dispersed phase Y)
$Y_2$; Fine dispersed phase (dispersed phase in dispersed phase Y)
Z; Gas bubble

The invention claimed is:

1. A foamed resin molded vehicle door trim base comprising an olefin-based resin composition containing an elastomer having a reactive group, an olefin resin and a polyamide resin, wherein
when a total of the elastomer having a reactive group, the olefin resin and polyamide resin contained in the olefin-based resin composition is taken as 100% by mass, a content of the elastomer having a reactive group is in a range of from 0.2 to 55% by mass, a content of the olefin resin is in a range of from 50 to 99.5% by mass, and a content the polyamide resin is in a range of from 0.3 to 60% by mass,
the elastomer having a reactive group is at least one selected from maleic anhydride-modified ethylene-propylene copolymer, a maleic anhydride-modified ethylene-1-butene copolymer, a maleic anhydride-modified ethylene-1-hexene copolymer, a maleic anhydride-modified ethylene-1-octene copolymer, and a maleic anhydride-modified propylene-1-butene copolymer,
the olefin resin is a polymer containing a structural unit derived from propylene,
the polyamide resin is at least one selected from polyamide 11 and polyamide 12,
the olefin-based resin composition has a continuous phase containing the olefin resin and a dispersed phase dispersed in the continuous phase and containing the polyamide resin,
the dispersed phase contains a melt-kneaded product of the polyamide resin and the elastomer having a reactive group that reacts with the polyamide resin, and
an expansion ratio of the foamed resin molded vehicle door trim base is 1.5 to 2.4 times.

2. The foamed resin molded vehicle door trim base according to claim 1, wherein the dispersed phase has a matrix phase containing the polyamide resin and a fine dispersed phase dispersed in the matrix phase and containing the elastomer having the reactive group, and gas bubbles formed by foaming are present not in the dispersed phase and the fine dispersed phase but only in the continuous phase.

3. The foamed resin molded vehicle door trim base according to claim 2, wherein the gas bubbles are formed by a decomposable foaming agent.

4. The foamed resin molded vehicle door trim base according to claim 1, wherein a ratio of the dispersed phase is 70% by mass or less per 100% by mass of a total of the continuous phase and the dispersed phase.

5. The foamed resin molded vehicle door trim base according to claim 1, wherein the polyamide resin is polyamide 11.

6. The foamed resin molded vehicle door trim base according to claim 1, wherein the elastomer having the reactive group is at least one selected from the maleic anhydride-modified ethylene-propylene copolymer and the maleic anhydride-modified ethylene-1-butene copolymer.

7. The foamed resin molded vehicle door trim base according to claim 1, wherein the elastomer having the reactive group is the maleic anhydride-modified ethylene-1-butene copolymer.

8. A foamed resin molded vehicle door trim base manufacturing method for manufacturing the foamed resin molded vehicle door trim base according to claim 1, comprising:
foaming a manufacturing material obtained by a method comprising a first melt-kneading in which a polyamide resin and an elastomer having a reactive group that reacts with the polyamide resin are dry-blended and then melt-kneaded; a second melt-kneading in which a first melt-kneaded product obtained in the first melt-kneading and an olefin resin are dry-blended and then melt-kneaded, and a mixing in which a second melt-kneaded product obtained in the second melt-kneading, an olefin resin, and a foaming agent are dry blended in which the second melt-kneaded product is 40-100% by mass of a total of the second melt-kneaded product and the olefin resin.

9. The foamed resin molded vehicle door trim base manufacturing method according to claim 8, wherein the olefin resin used in the mixing is different from the olefin resin used in the second melt-kneading.

10. The foamed resin molded vehicle door trim base manufacturing method according to claim 9, wherein the olefin resin used in the mixing has flowability higher than that of the olefin resin used in the second melt-kneading.

11. The foamed resin molded vehicle door trim base according to claim 1, wherein the expansion ratio of the foamed resin molded vehicle door trim base is 1.5 to 1.8 times.

12. The foamed resin molded vehicle door trim base according to claim 1, wherein the olefin resin is a propylene block polymer.

13. The foamed resin molded vehicle door trim base according to claim 1, obtained by a method comprising:
a first melt-kneading in which the polyamide resin and the elastomer having a reactive group that reacts with the polyamide resin are dry-blended and then melt-kneaded;

a second melt-kneading in which a first melt-kneaded product obtained in the first melt-kneading and an olefin resin are dry-blended and then melt-kneaded, and a mixing in which a second melt-kneaded product obtained in the second melt-kneading, an olefin resin, and a foaming agent are dry blended in which the second melt-kneaded product is 40-100% by mass or more of a total of the second melt-kneaded product and the olefin resin.

14. The foamed resin molded vehicle door trim base according to claim 13, wherein gas bubbles are formed by a decomposable foaming agent.

* * * * *